(12) United States Patent
Stancyk et al.

(10) Patent No.: US 10,234,647 B2
(45) Date of Patent: Mar. 19, 2019

(54) OPTICAL TERMINATION BOX

(71) Applicant: FURUKAWA ELECTRIC LATAM S.A., Curitiba (BR)

(72) Inventors: Anderson Marcelo Stancyk, Araucária (BR); Wilherm Toshio Kinoshita Yoshizawa, Curitiba (BR); Gabriel Tanner Pasetti, Curitiba (BR)

(73) Assignee: FURUKAWA ELECTRIC LATAM S.A., Curitiba, Paraná (BR)

( * ) Notice: Subject to any disclaimer, the term of this patent is extended or adjusted under 35 U.S.C. 154(b) by 0 days.

(21) Appl. No.: 15/837,796

(22) Filed: Dec. 11, 2017

(65) Prior Publication Data

US 2018/0164523 A1 Jun. 14, 2018

(30) Foreign Application Priority Data

Dec. 9, 2016 (BR) .............................. 102016029000

(51) Int. Cl.
*G02B 6/44* (2006.01)
*G02B 6/38* (2006.01)

(52) U.S. Cl.
CPC ......... *G02B 6/4444* (2013.01); *G02B 6/4441* (2013.01); *G02B 6/4471* (2013.01); *G02B 6/3897* (2013.01)

(58) Field of Classification Search
CPC .................................... G02B 6/44; G02B 6/38
USPC ......................................................... 385/135
See application file for complete search history.

(56) References Cited

U.S. PATENT DOCUMENTS

| | | | | |
|---|---|---|---|---|
| 5,402,515 A | * | 3/1995 | Vidacovich | G02B 6/4452 385/135 |
| 5,481,639 A | * | 1/1996 | Cobb | G02B 6/4442 385/135 |
| 6,974,262 B1 | * | 12/2005 | Rickenbach | G02B 6/3817 385/53 |
| 8,213,761 B2 | * | 7/2012 | Gronvall | G02B 6/4471 385/135 |
| 8,422,846 B2 | * | 4/2013 | Ruiz | G02B 6/4452 385/135 |
| 9,513,451 B2 | * | 12/2016 | Corbille | G02B 6/4454 |

(Continued)

FOREIGN PATENT DOCUMENTS

JP H-08-234025 9/1996
WO WO 2009089327 A2 * 7/2009 ........... G02B 6/3897

*Primary Examiner* — Kaveh C Kianni
(74) *Attorney, Agent, or Firm* — B. Aaron Schulman, Esq.; Stites & Harbison, PLLC.

(57) ABSTRACT

An optical termination box comprising: a tubular housing (10) with an open end (10*b*) and a closed end (10*a*) provided with an input opening (11) for an optical distribution cable (100); a cover (20) securable against the open end (10*b*) of the housing (10) and pierced by output adapters (30); and an optical fiber accommodating tray (40), internal to the tubular housing (10) and having a first end (41) carrying a tubular bushing (50) with a base portion (51) seated against the closed end (10*a*) of the tubular housing (10), and a projecting body portion (52) out of the input opening (11), to cooperate with a puller (60) that holds the tubular bushing (50) hermetically pressed against the closed end (10*a*) of the tubular housing (10). The tubular bushing (50) hermetically receives and retains an end portion (100*a*) of an optical distribution cable (100) containing at least one optical fiber (FO).

13 Claims, 16 Drawing Sheets

(56) References Cited

U.S. PATENT DOCUMENTS

| | | | | |
|---|---|---|---|---|
| 2006/0032659 A1* | 2/2006 | Allen | .................... | G02B 6/445 |
| | | | | 174/92 |
| 2009/0046985 A1* | 2/2009 | Gronvall | .............. | G02B 6/4442 |
| | | | | 385/135 |
| 2009/0060421 A1* | 3/2009 | Parikh | ................. | G02B 6/4442 |
| | | | | 385/71 |
| 2009/0238531 A1* | 9/2009 | Holmberg | ............ | G02B 6/3897 |
| | | | | 385/135 |
| 2009/0297112 A1* | 12/2009 | Mertesdorf | .......... | G02B 6/3897 |
| | | | | 385/135 |
| 2013/0101262 A1* | 4/2013 | Wei | ...................... | G02B 6/4442 |
| | | | | 385/135 |
| 2013/0209049 A1* | 8/2013 | Kowalczyk | .......... | G02B 6/4457 |
| | | | | 385/135 |
| 2015/0286022 A1* | 10/2015 | Holmberg | ............ | G02B 6/4452 |
| | | | | 385/135 |
| 2016/0202441 A1* | 7/2016 | Claessens | ............ | G02B 6/3897 |
| | | | | 385/113 |
| 2017/0063470 A1* | 3/2017 | Smith | .................... | G02B 6/483 |

* cited by examiner

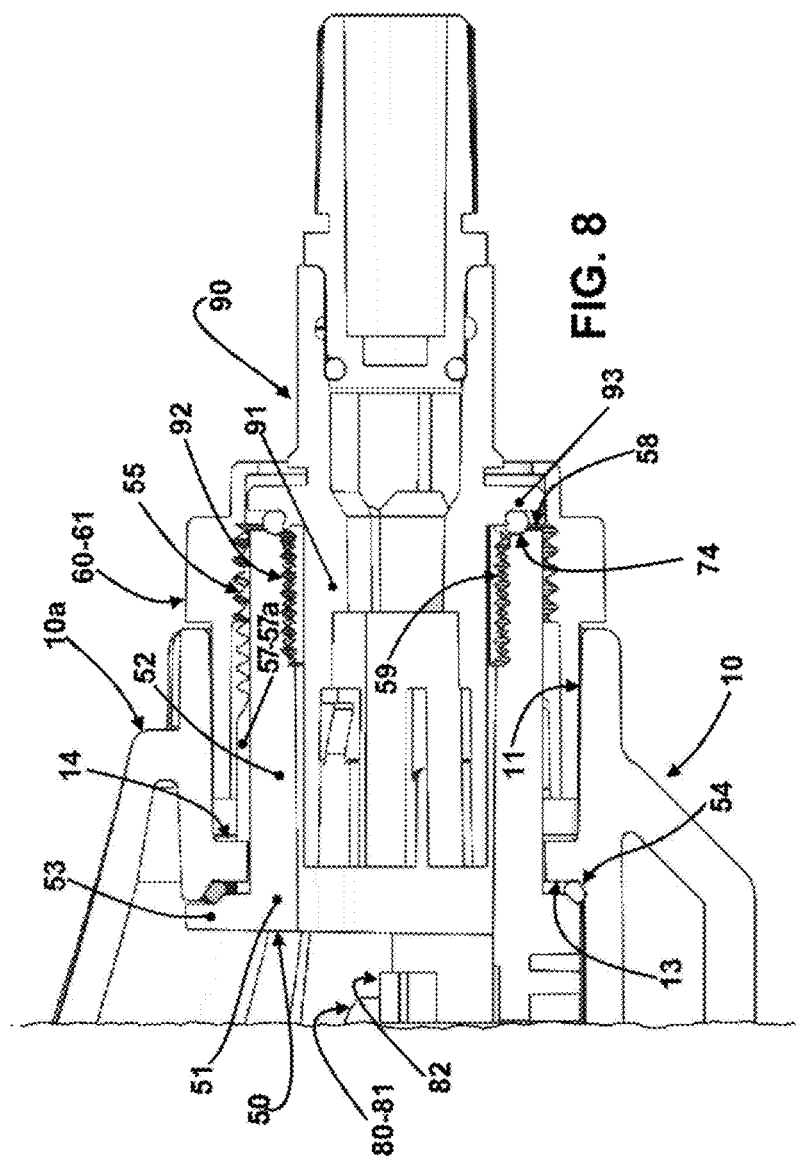
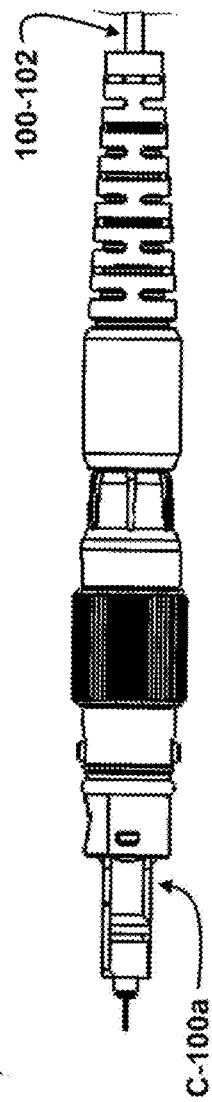

OPTICAL TERMINATION BOX

FIELD OF THE INVENTION

This invention relates to a hermetic optical termination box having a housing provided with an input opening for receiving and retaining an optical distribution cable formed of one or more optical fibers and an output opening to be closed by a sealed cover, provided with a plurality of output adapters each having an inner end connectable to a respective fiber or fiber splice of the optical distribution cable and an outer end adapted to receive the connector from a terminal of a user ("distribution cable").

STATE OF THE ART

Several multi-output optical termination box constructions are known are known for connecting multiple optical user terminal cables from an optical distribution cable to be received in the said boxes.

In such known constructions, the single optical fiber or each of the multiple optical fibers of the optical distribution cable, received in the optical termination box, is connected to a respective output adapter, mounted on a box cover, by means of fiber optic extensions of the distribution cable itself or through splitters of a single optical fiber defining the distribution cable when it is, for example, low friction type.

The connection between the fiber optic distribution cable and the output adapters of the box closure cover has been made in the field at the installation site of the optical termination box by the installer operator.

The manual operations of receiving and retaining the optical distribution cable in the termination box, separating the different optical fiber of the cable or splitting it into multiple extensions of optical fibers (splitters), to accommodate those optical fiber extensions separated or split into an inner tray of the box and connecting the said fiber extensions at the inner ends of the output adapters of the box closure cover, they are conventionally carried out by the installer operator at the assembly site of such boxes, making said operations extremely laborious, time consuming and still susceptible to a high rate of human errors in their assembly.

Furthermore, such known optical termination boxes do not have a permanently sealed construction to ensure the protection of splice and optical fusions, in particular because of their constructive features requiring the adaptation of the distribution cable and its connection or the connection of its optical fibers to the respective output adapters is made in the field, before the final and definitive closure of the box cover.

The above-mentioned drawbacks, related to the difficulties of assembling such known termination boxes, occur even in those termination boxes which have an internal tray, accommodating fiber optic extensions in the form of tights or bare, carried by the box closure cover, to allow the accommodation of said fiber extensions to be performed prior to the displacement of the cover-tray assembly into the box housing upon closure of the box. Optical termination boxes having such characteristics can be found, for example, in U.S. Pat. No. 8,422,846B2 and JP08-234025.

SUMMARY OF INVENTION

Due to the limitations and drawbacks of known termination boxes, this invention has the objective of providing a box of the type contemplated herein and having a sealed and permanent sealed construction, allowing the termination box to receive optical cables from multiple fiber distribution or low friction with only one fiber and preventing the release of the optical distribution cable and the movement of the internal accommodating elements or the optical fiber extensions inside the termination box housing, avoiding movement of the optical components due to vibrations or impacts.

The optical termination box proposed by this invention consists of: a tubular housing having a closed end provided with an input opening for an optical distribution cable; a cover, securable against an open end of the housing and pierced by output adapters; and an optical fiber accommodating tray, housed within the tubular housing and having a first end seated against the closed end of the tubular housing and a second end assembled in the cover.

According to the invention, the tray carries a tubular bushing having a base portion, seated against the closed end of the tubular housing, and a body portion which projects out of the input opening and cooperates with a traction device that maintains the base portion of the tubular bushing hermetically pressed and sealed, against the closed end of the tubular housing. The tubular bushing receives and hermetically retains an end portion of an optical distribution cable containing at least one optical fiber.

BRIEF DESCRIPTION OF THE DRAWINGS

The invention will now be described with reference to the accompanying drawings, given by way of example only and in which:

FIG. 8 is an enlarged longitudinal cross-sectional view of the closed end region of the tubular housing of the optical termination box of FIG. 7, with an input adapter in the assembled condition;

FIG. 8A depicts a single optical fiber cable, generally low friction type, with an end portion defined by a connector to be coupled to the input adapter shown in FIGS. 7 and 8;

DETAILED DESCRIPTION OF THE INVENTION

As already mentioned and illustrated in the accompanying drawings, the invention concerns a hermetic optical termination box, having a tubular housing 10, generally trunk-conical and formed into any suitable material, for example polypropylene having 30% glass fiber or other polymer suitable for installation at the time, having a closed end 10a, generally with smaller cross-section, and an open end 10b opposite the first and with greater cross-section.

Figure 1:
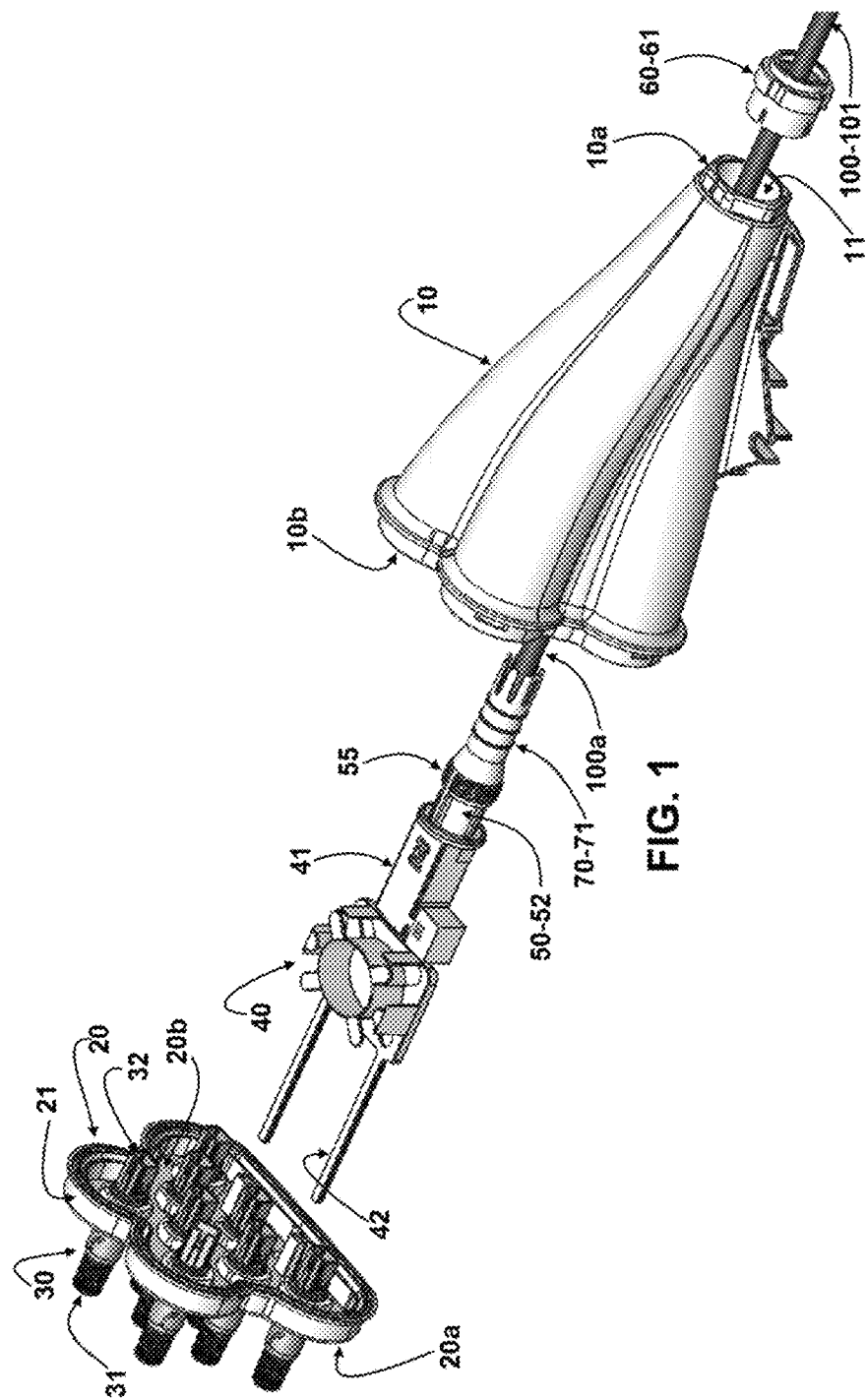
FIG. 1 is an exploded perspective view of a first optical termination box configuration in question, receiving an optical distribution cable comprising multiple optical fibers.
Figure 2:
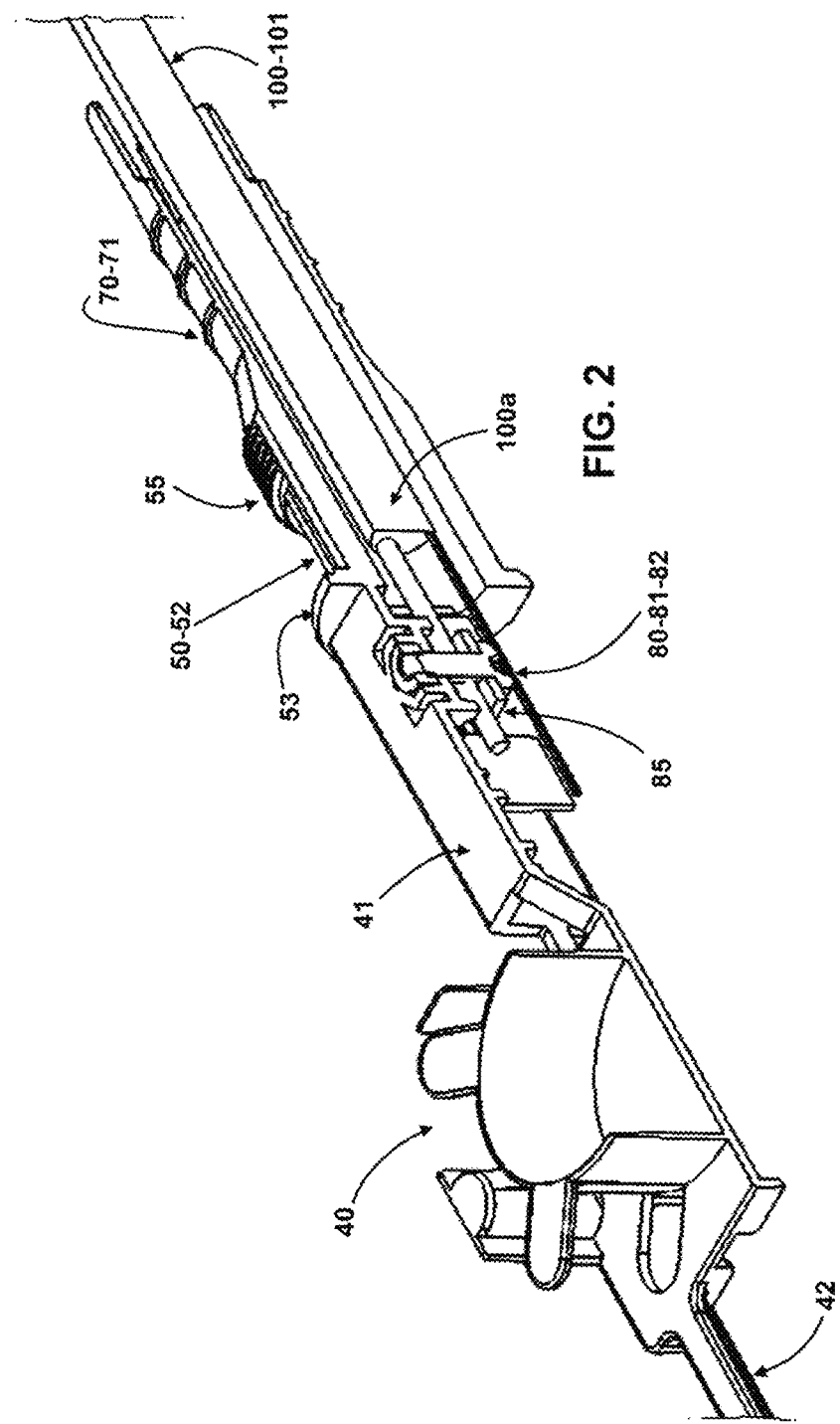
FIG. 2 is a perspective and partially cut view of a portion of FIG. 1 to illustrate the axial anchoring of the optical distribution cable in the tray-housing assembly.
Figure 3:
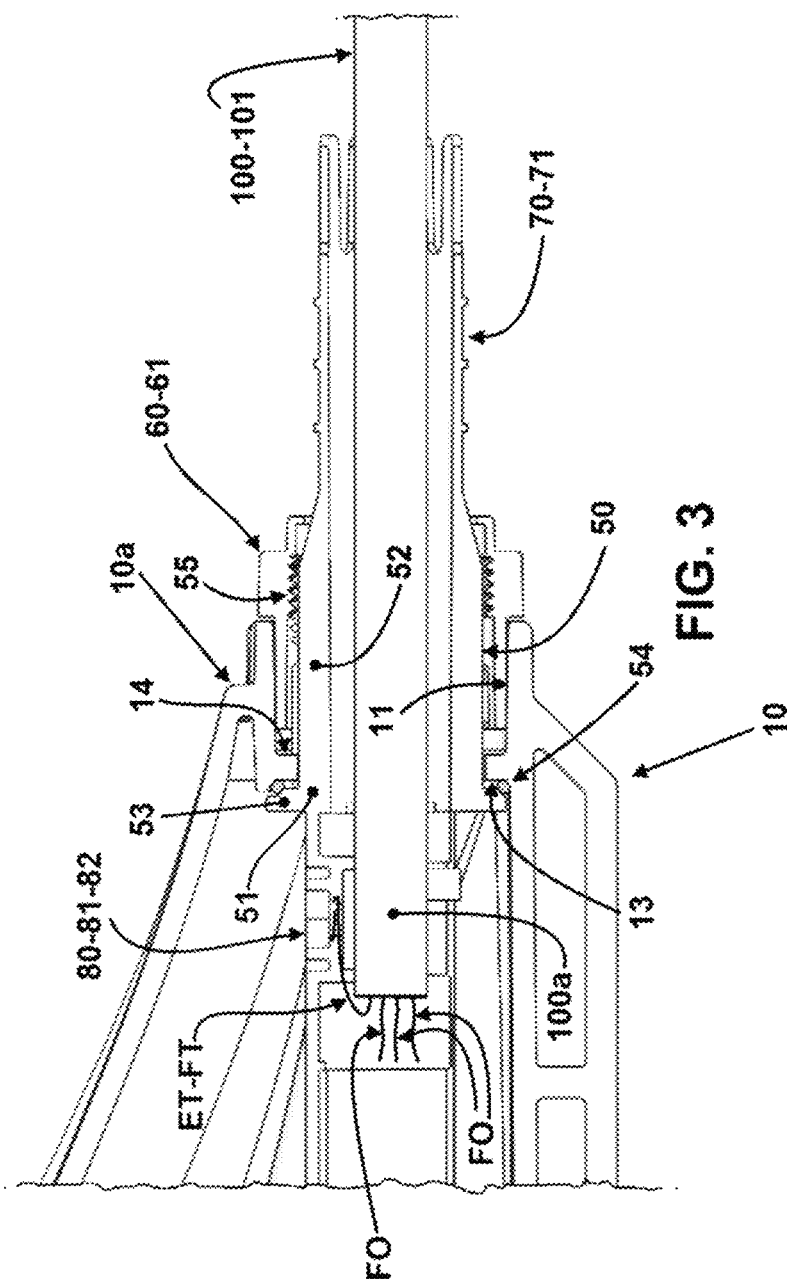
FIG. 3 is an enlarged longitudinal cross-sectional view of the closed end region of the tubular housing of the optical termination box of FIGS. 1 and 2, in the assembled condition.
Figure 4:
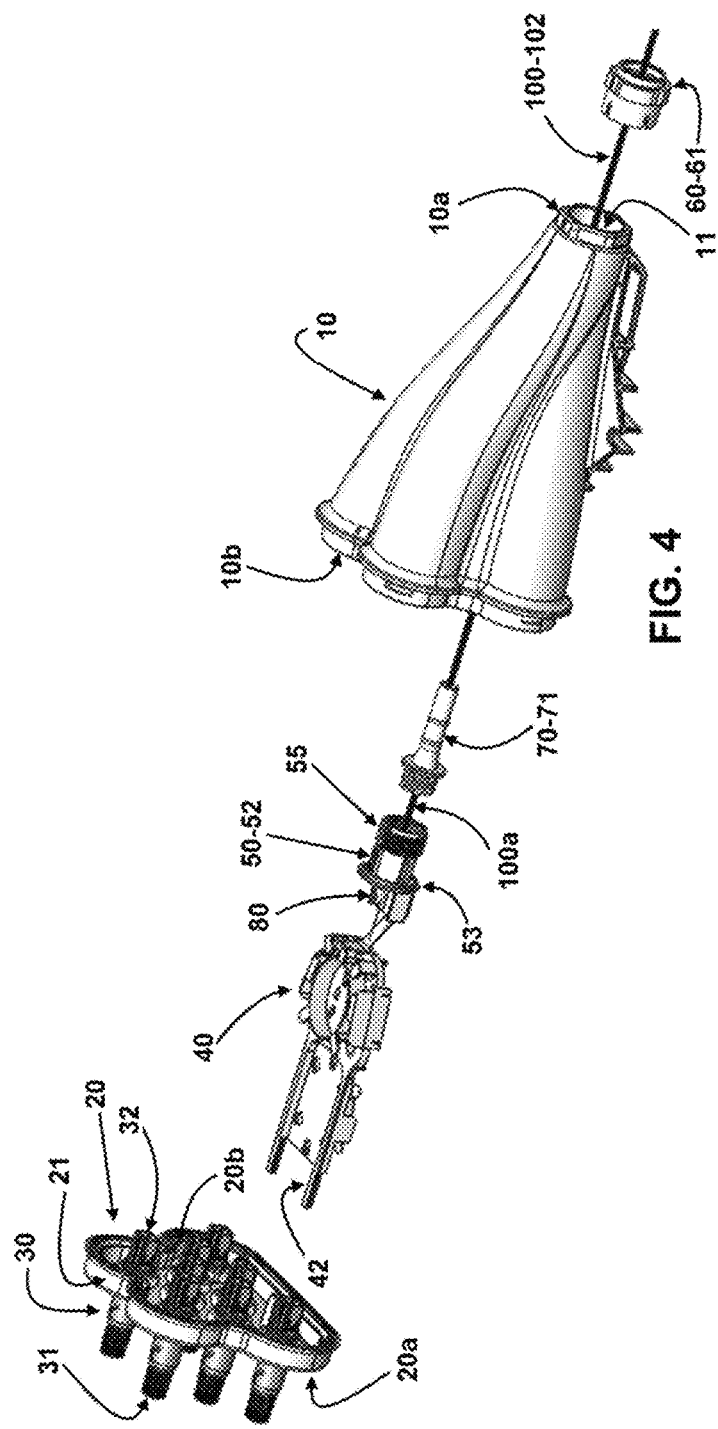
FIG. 4 shows an exploded perspective view of a second configuration of the optical termination box in question, receiving an optical low-friction distribution cable with a single optical fiber.
Figure 5:
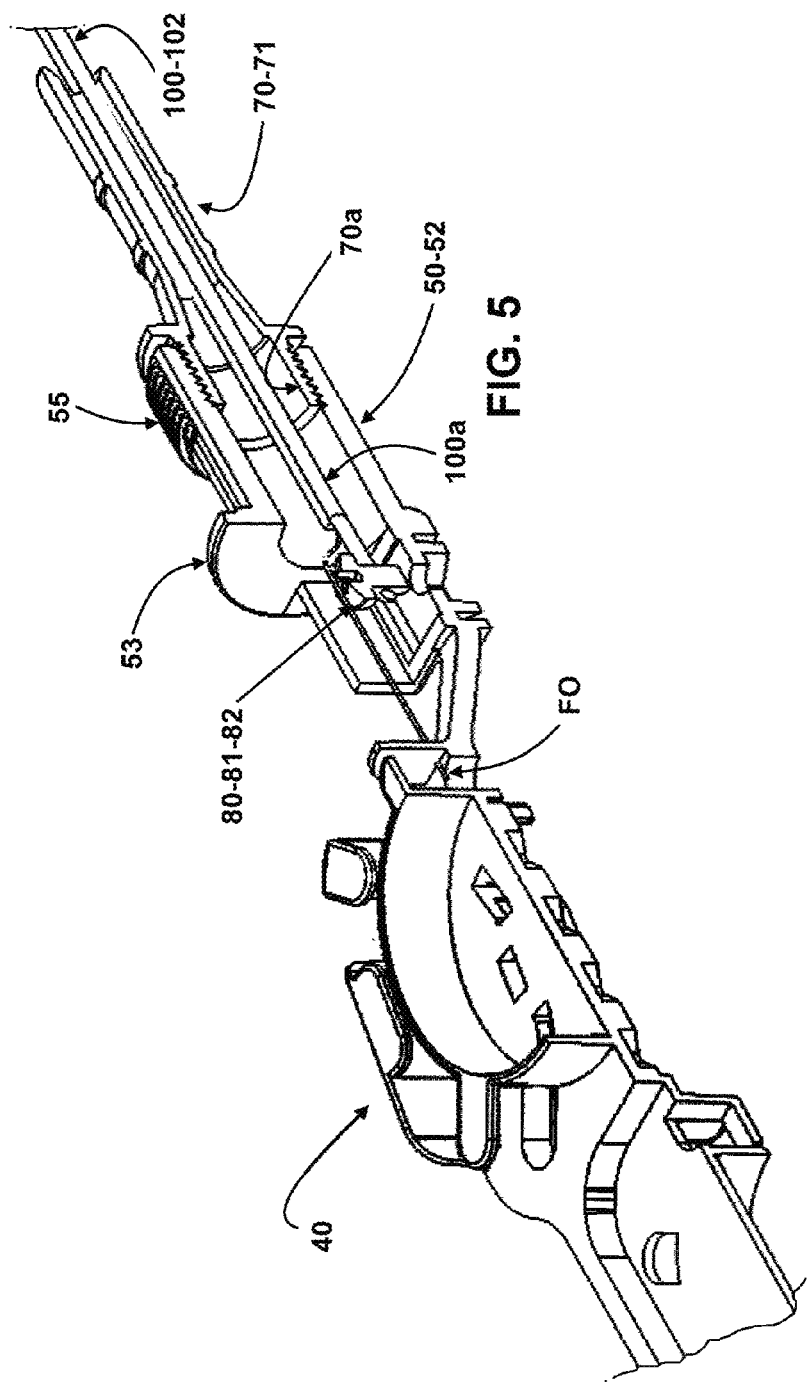
FIG. 5 is a perspective and partially cut view of a portion of FIG. 4 to illustrate the axial anchoring of the optical distribution cable, low-friction type, in the tray-housing assembly.
Figure 6:
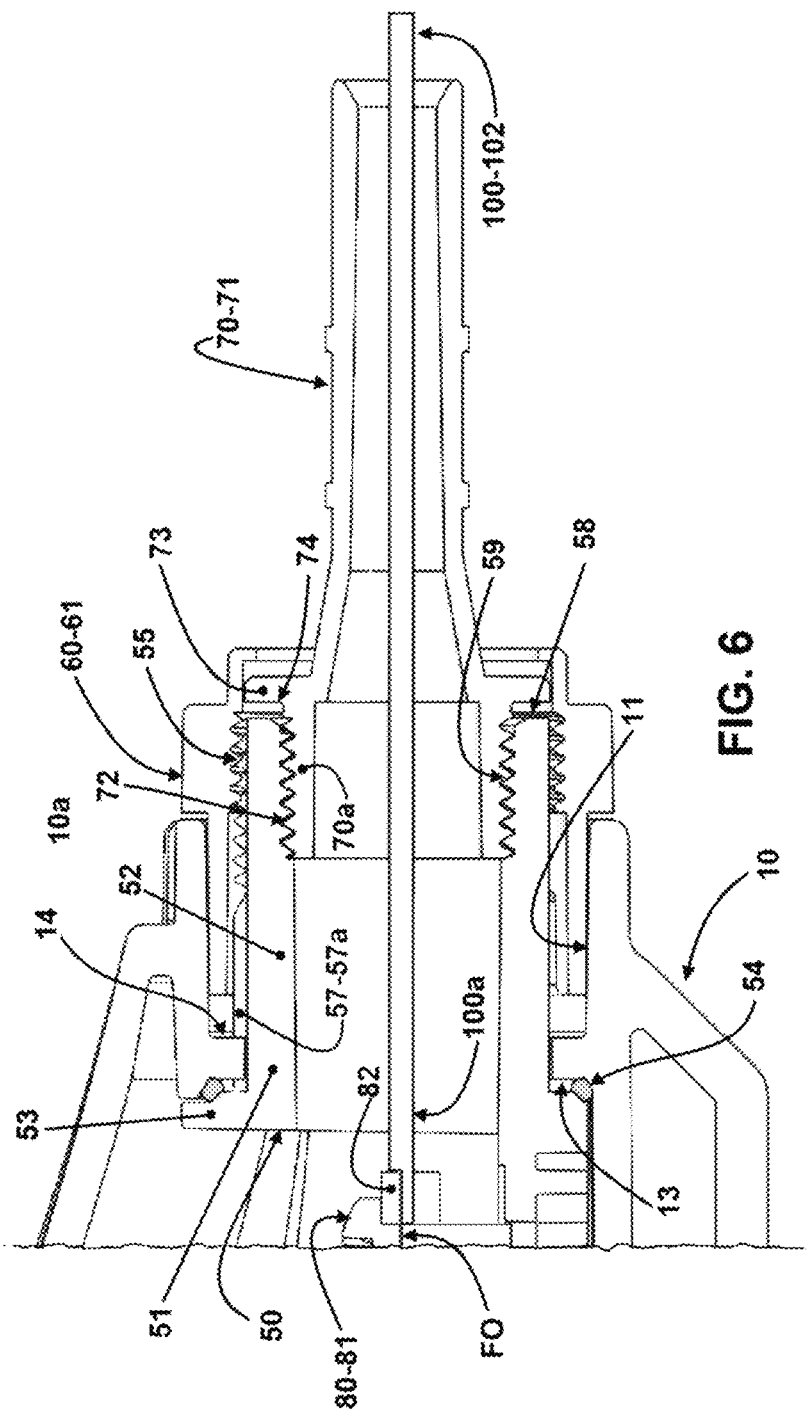
FIG. 6 is an enlarged longitudinal cross-sectional view of the closed end region of the tubular housing of the optical termination box of FIGS. 4 and 5, in the assembled condition.

The tubular housing 10 has its closed end 10a provided with an input opening 11 for receiving an optical distribution cable 100, which may be a multiple fiber cable 101, formed of multiple optical fibers to be separated in respective fiber extensions (not shown), generally provided with a coating in acrylate and are accommodated within the tubular housing 10, as is the case shown in FIGS. 1, 2 and 3 of the accompanying drawings or a low friction cable 102, as shown in FIGS. 4 to 6, having a single optical fiber, to be divided into multiple bare fiber splitters (not shown) to be accommodated within the tubular housing 10, as described below.

Figure 11:
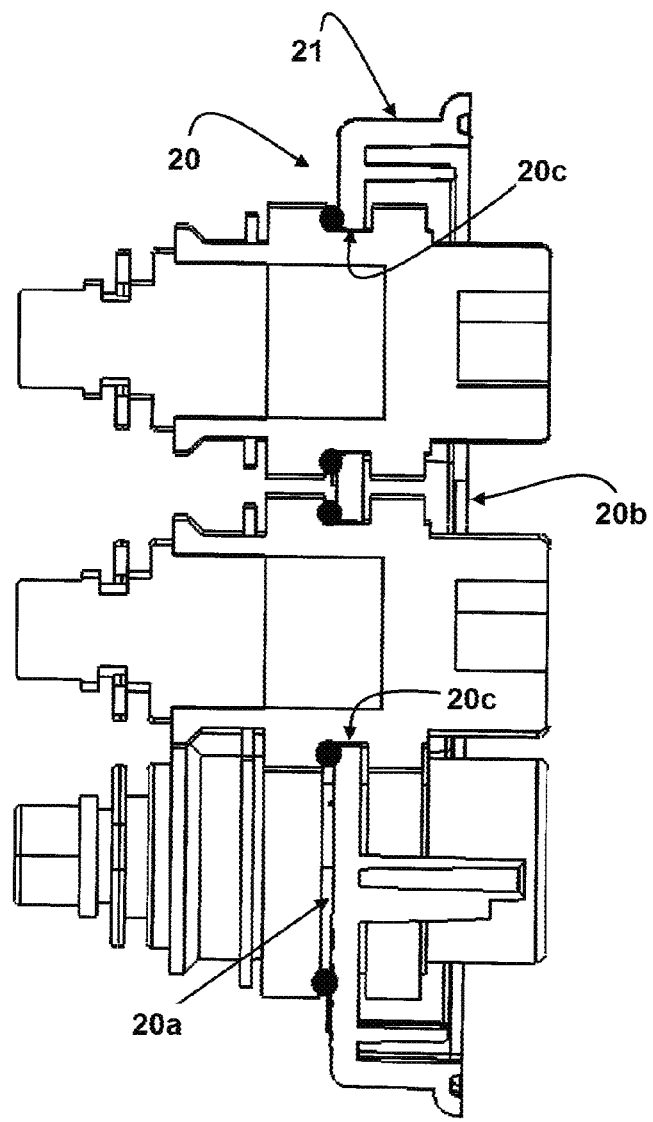
FIGS. 11 and 12 are cross-sectional views of the covers shown in FIGS. 9 and 10, respectively.
Figure 12:
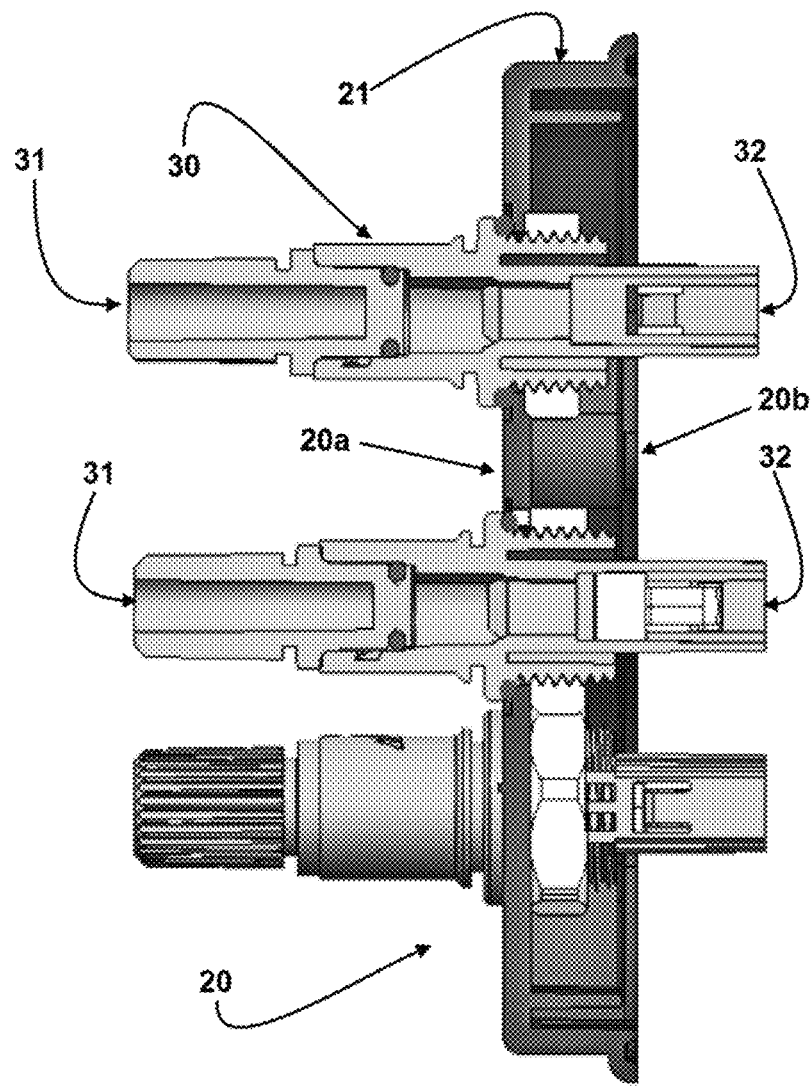
Figure 13:
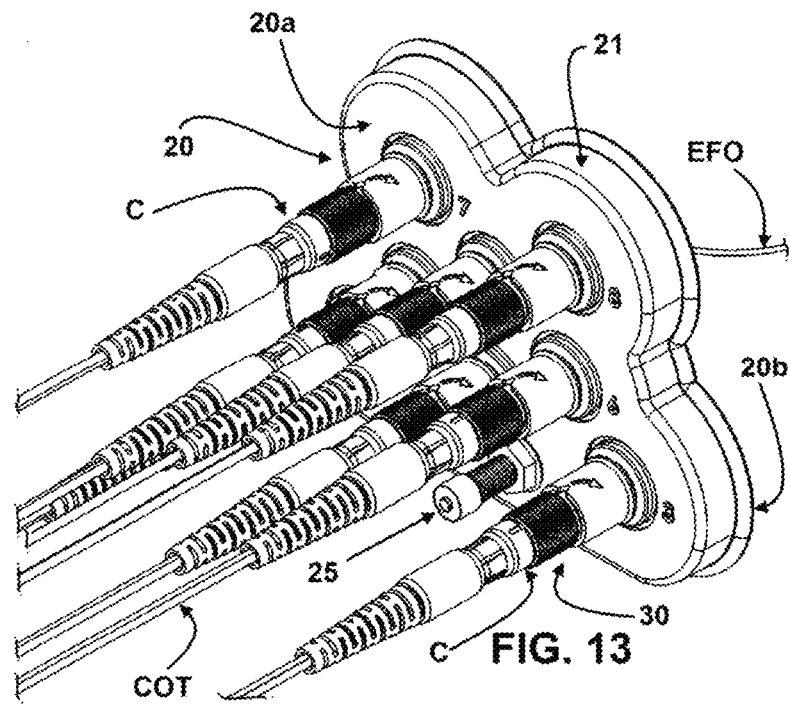
FIGS. 13 and 14 show an external and internal perspective view of the cover already provided with the output adapters and the pressurizing valve and the output adapters, each receiving the connector pre-fitted to the end of an optical cable and further illustrating the connecting of an internal optical fiber extension to the box and adapted to the inner end of an output adapter.
Figure 14:
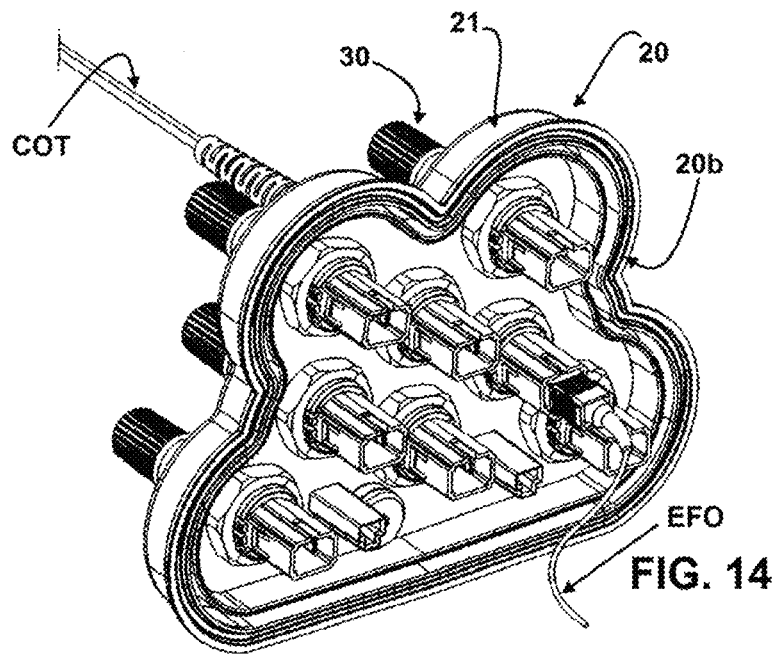
Figure 15:
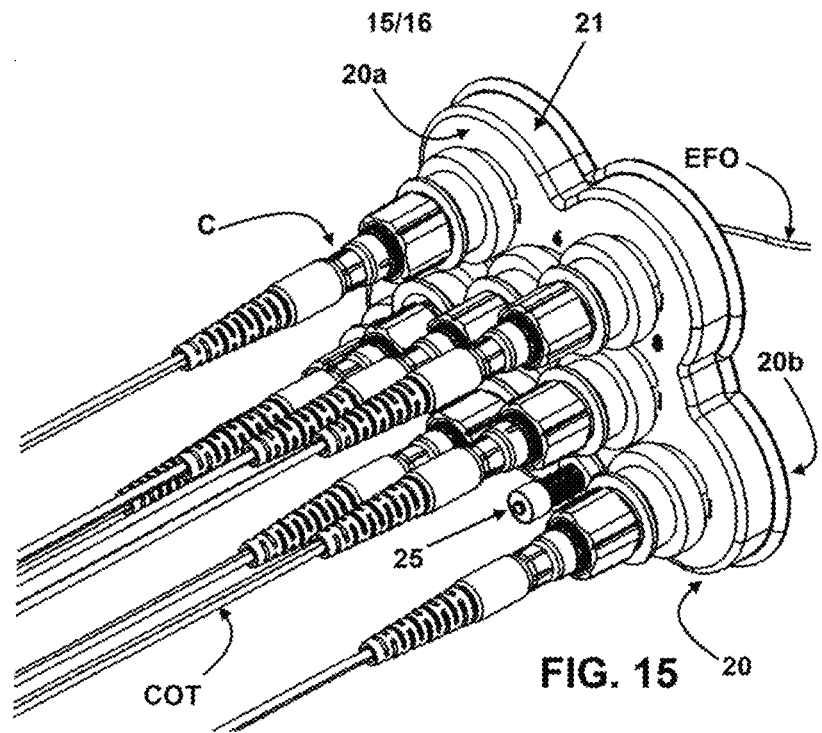
FIGS. 15 and 16 represent perspective views, similar to those of FIGS. 13 and 14, but illustrating another output adapter model.
Figure 16:
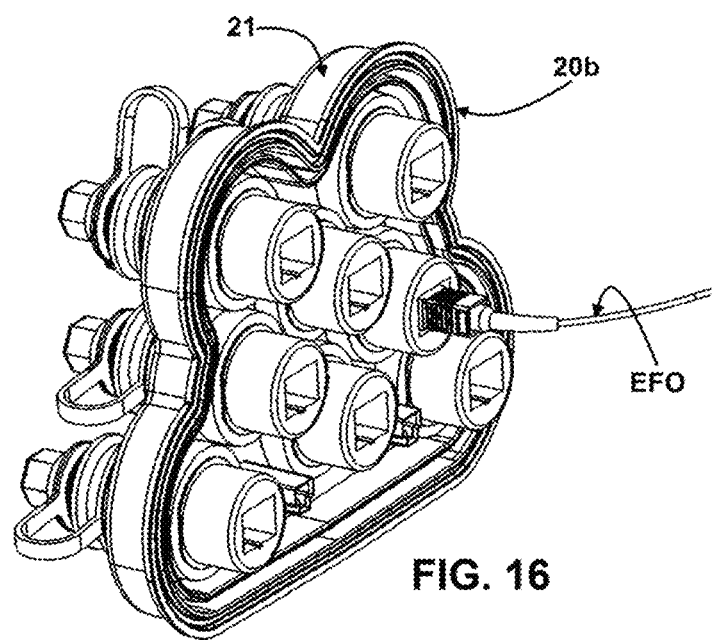

The optical termination box comprises a cover 20, which is constructed in any suitable polymer and having an outer side 20a and an inner side 20b that is securable against the open end 10b of the tubular housing 10. The cover is pierced, in respective through-holes 20c (FIG. 11), using output adapters 30 each having an outer end 31 and an inner end 32 to be connected to the optical distribution cable 100, i.e., to a respective bare fiber splitter (not shown), divided from a single low friction optical cable fiber 102, or an EFO optical fiber extension (see FIGS. 13, 14, 15 and 16) defined by one of the multiple fibers of a multiple optical fiber cable 101. The outer end 32 of each output adapter 30 is adapted to receive a connector C from a respective COT optical terminal cable of a user ("drop cable"—see FIGS. 13, 14 and 15).

In the construction proposed by the invention, the cover 20 has, on its inner side, a peripheral skirt 21 to be telescopically mounted and assembled, hermetically and sealed, attached to a peripheral portion of the open end 10b of the tubular housing 10, each adapter of the output 30, having any suitable construction, known or not known in the prior state of art, pierced, hermetically, a respective through-hole 20c of the cover 20. Thus, upon sealing of the cover 20 over the open end 10b of the tubular housing 10, this open end 10b becomes completely sealed by the cover 20, which can no longer be detached from the tubular housing 10. The sealing of the cover 20 can be done in different ways, using adhesives and/or welding.

Figure 9:
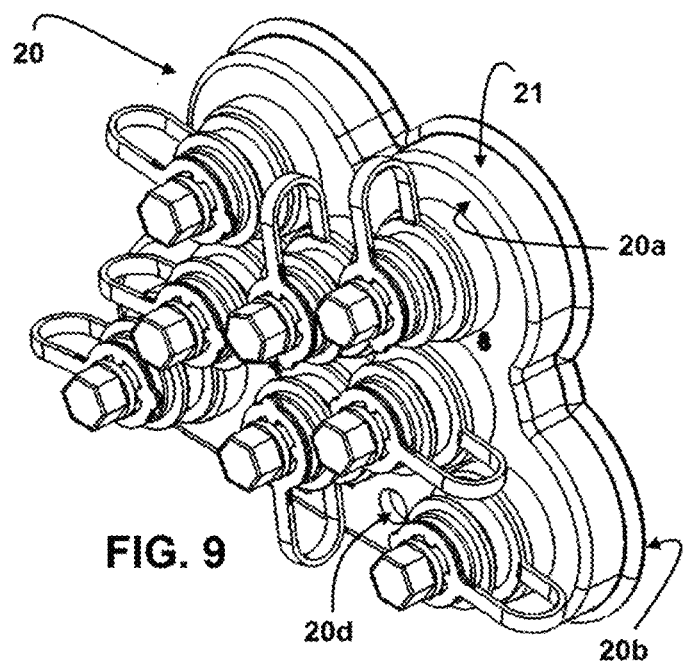
FIG. 9 shows a perspective view of the cover from its outer side, showing the assembly of plugs-cover in through-holes of the cover which is further provided with a through-hole for accommodating a check valve for pressurizing the sealed box.
Figure 10:
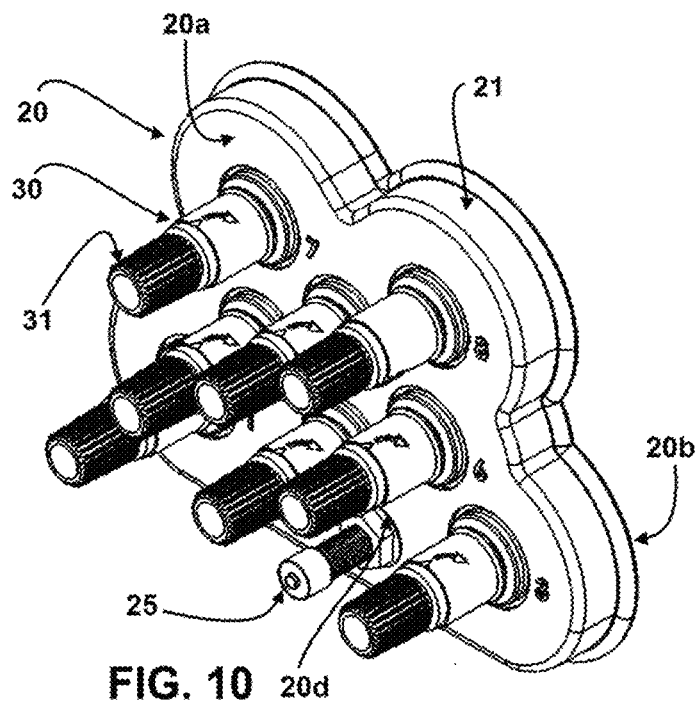
FIG. 10 shows a perspective view of the cover from its outer side, illustrating the assembly of the multiple adapters and a pressurizing valve through the through-holes and through-hole provided in the cover.

As described further below, the tubular housing 10 is designed to operate in a totally hermetic manner after assembling the end portion 100a of the optical distribution cable 100 to the tubular housing 10 and the closure of the cover 20. Thus, the tubular housing 10 with its input opening and its open end 10b, which is already hermetically sealed, may be pressurized with a suitable gas, to be introduced into the tubular housing 10 by means of a check valve 25 mounted in to be pierced through a through-hole 20d in the cover 20, as shown in FIGS. 9 and 10.

The optical termination box further comprises an optical fiber accommodating tray 40, bare or in extensions of EFO optical fiber, generally constructed of non-electrically conductive plastic material and which is housed inside the tubular housing 10 when the latter is attached to the cover 20. The tray 40 has a first end 41, to be seated internally against the closed end 10a of the tubular housing 10, and a second end 42 internally mounted to the cover 20, i.e., the inner side 20b of the latter, to be moved therein at the time of sealing the cover 20 at the open end 10b of the tubular housing 10.

The tray 40 may have different constructions suitable for accommodating EFO optical fiber bundles or bare splitter fibers, the second end 42 of the tray 40, configured to be engaged and retained against the inner side 20b of the cover 20, to be displaced with the latter, at the time of sealing the open end 10b of the tubular housing 10.

According to a first aspect of the invention, the first end 41 of the tray 40 carries a tubular bushing 50, also formed of plastic material and having a base portion 51 to be seated, through the interior of the tubular housing 10, against the closed end 10a of the latter, and a body portion projecting out of the input opening 11 and externally cooperating with a puller 60 operably associated with the closed end 10a of the tubular housing 10 to maintain the base portion 51 of the tubular bushing 50 axially pressed against the closed end 10a of the tubular housing 10.

As can best be seen from FIGS. 3, 6 and 8, the tubular bushing 50 receives and retains, directly or indirectly, therein, hermetically, an end portion 100a of the optical distribution cable 100 containing at least one optical fiber.

FIGS. 3, 6 and 8 illustrate a preferred construction and according to which the closed end 10a of the tubular housing 10 has, around the input opening 11, an internal annular stop 13, facing the inner part of the tubular housing 10 and an outer annular stop 14 facing outwardly.

On the other hand, the base portion 51 of the tubular bushing 50 is externally provided with a peripheral flange 53 to be pressed by the puller 60, hermetically, against the inner annular stop 13 of the tubular housing 10 and the puller 60 seated against the outer annular stop 14 of the tubular housing 10.

The construction, described above, allows the puller 60, cooperating with the body portion 52 of the tubular bushing 50, to be driven against the outer annular stop 14 of the tubular housing 10, axially pulling the tubular bushing outwardly and forcing the peripheral flange 53 thereof against the inner annular stop 13 of the tubular housing 10. Between the peripheral flange 53 and the inner annular stop 13 is provided at least one gasket 54, generally an O-ring of elastomeric material, to ensure complete and secure sealing between the tubular bushing 50 and the closed end 10a of the tubular housing 10. [0040] In the illustrated construction, the body portion 52 of the tubular bushing 50 is provided with an external thread 55 and the puller 60 is defined by a nut 61 to be engaged with the external thread 55 of the body portion 52 and seated against the annular stop 14 of the closed end 10a of the tubular housing 10. Tightening of the nut 61 causes pressing of the peripheral flange 53 against the inner annular stop 13, compressing the packing gasket 54 and ensuring the sealing of the tubular bushing 50—tubular housing 10.

Figure 17:
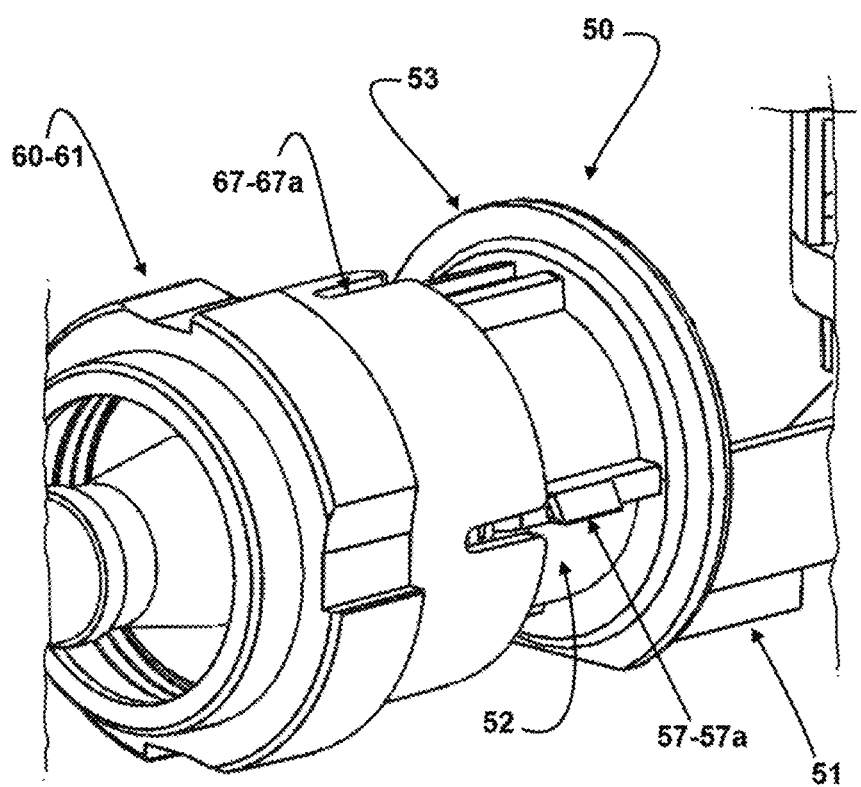
FIG. 17 is a perspective view of the nut and the adjacent body portion of the tubular bushing, showing the engaging means for locking the nut.

As best shown in FIG. 17, the body portion 52 of the tubular bushing 50 incorporates at least one locking means 57, the nut 61 being provided with at least one catch receiving means 67 to be engaged with the locking means 57 so as to lock the nut 61 against unscrewing, after the latter has reached a final pulling position of the tubular bushing 50. Thus, after the final fixing of the tubular bushing 50, by tightening the nut 61, the latter can no longer be released, keeping the tubular bushing definitively fixed to the tubular housing 10.

In the illustrated construction, the locking means 57 takes the form of an outer shoulder 57a incorporated into the body portion 52 of the tubular bush 50, proximate to the base portion 51, but externally to the tubular housing 10, the catch receiving means 67 being defined by a slot 67a to be engaged with the shoulder 57a, locking the nut 61 in its final traction position of the tubular bushing 50.

In the constructions shown in FIGS. 1 to 3 and 4 to 6, the body portion 52 of the tubular bushing 50 carries a tubular extension 70 within which is hermetically housed and retained the end portion 100a of the optical distribution cable 100, hermetically closing the input opening 11. In the two embodiments exemplified in FIGS. 1 to 3 and 4 to 6, the tubular extension 70 of the tubular bushing 50 is defined by a heat shrinkable tube 71 surrounding an extension of the optical delivery cable 100, having at least one optical fiber FO and at least two the traction elements ET and whose end portion 100a penetrates into the tubular housing 10 through the interior of the tubular bush 50, said traction elements ET being secured at least in part to a holding means 80 carried by the base portion 51 sleeve 50.

Figure 3A:
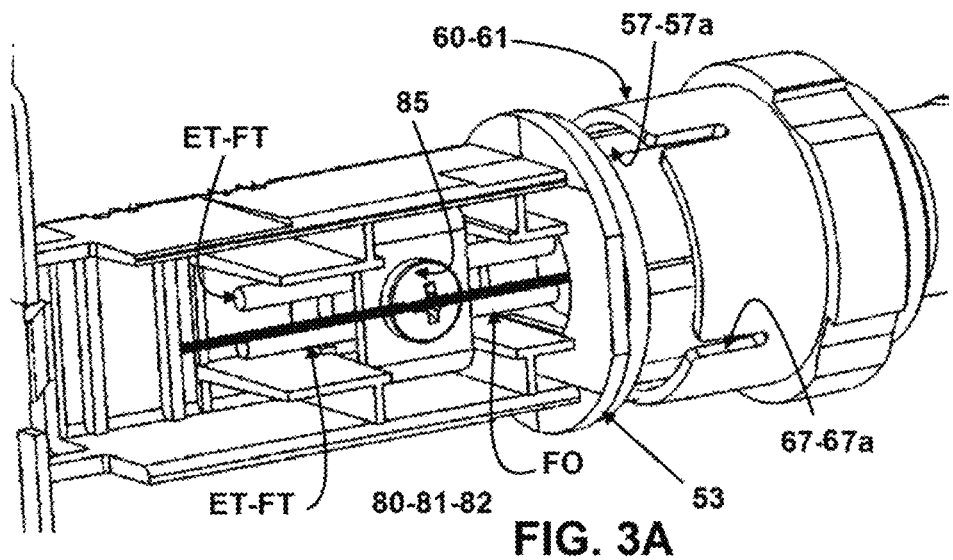
FIGS. 3A and 3B show enlarged details of the portion of FIG. 3 in which the traction elements of the optical cable are locked.
Figure 3B:
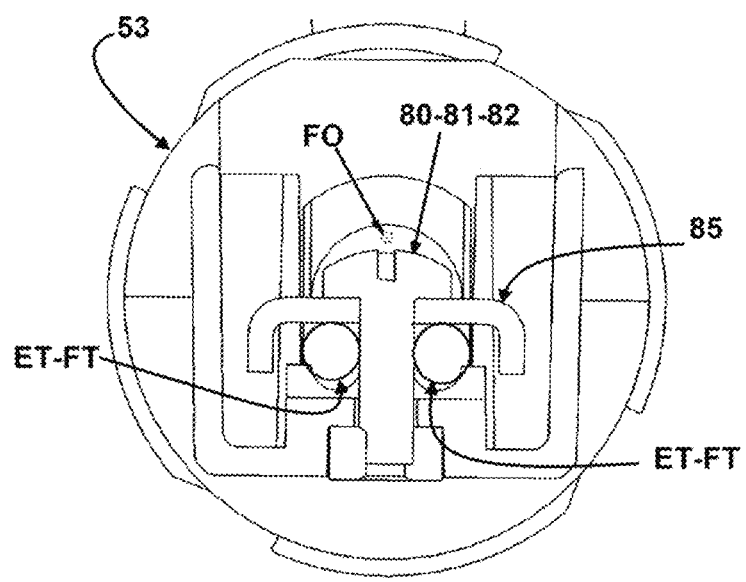
Figure 4A:
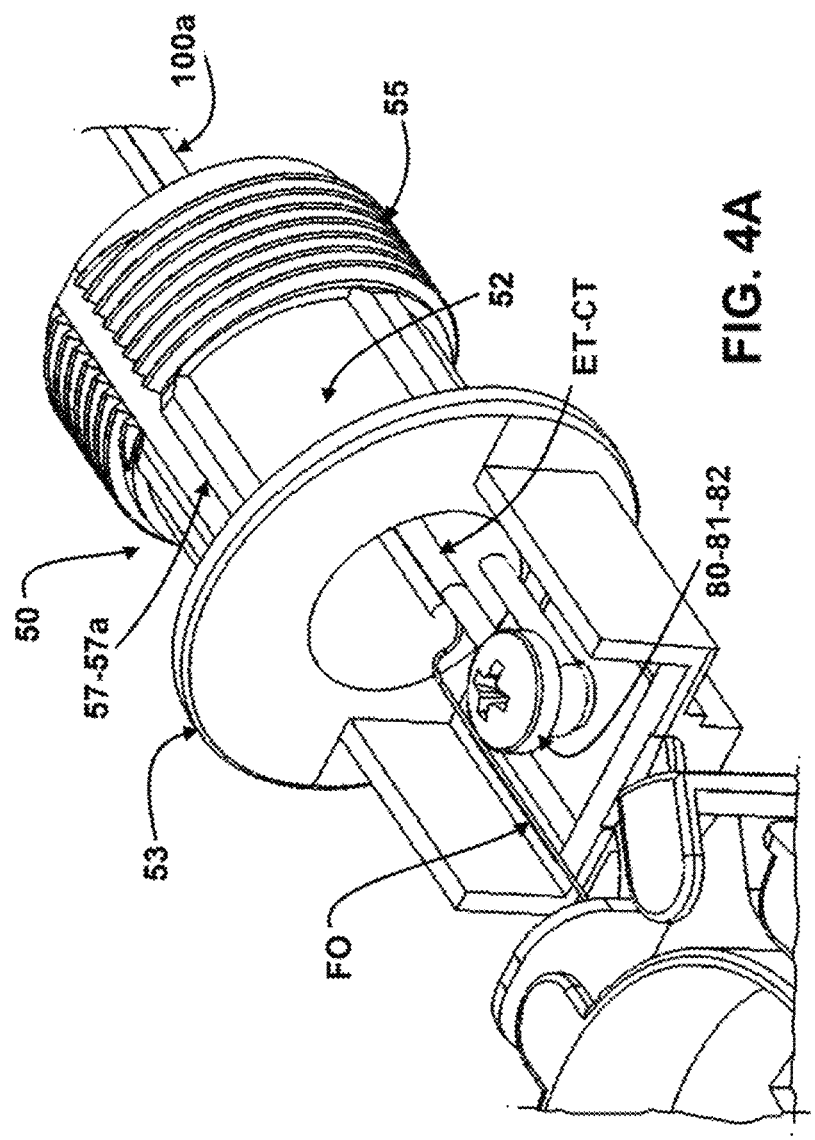
FIG. 4A shows an enlarged detail of the portion of FIG. 4 in which the traction elements of the optical cable are locked.

The retaining means 80 may take the form, for example, of a screw 81, transversally assembled on the base portion 51 of the tubular bushing 50, so as to enable the ET traction elements to be locked in their surroundings, which may be, for example, in the form of FT traction wires of a multiple fiber cable 101, or in the form of CT traction cables of a low friction cable 102. The enlarged head 82 of the screw 81 directly compresses (see FIGS. 4A, 5 and 6) or by means of a plate 85 (see FIGS. 3A and 3B), the locking extensions of the traction elements ET, against a confronting surface portion of the tubular bushing 50.

In the configuration shown in FIGS. 1 to 3, the tubular extension 70 is incorporated, in one piece, to the body portion 52 of the tubular bushing 50.

On the other hand, in the configuration shown in FIGS. 4 to 6, the tubular extension 70 takes the form of a separate part and is hermetically coupled to the body portion of the tubular bushing 50. In the embodiment shown in FIGS. 4 to 6, the body portion 52 of the tubular bushing 50 has an end annular stop 58 and an inner thread 59, wherein the tubular extension 70, in a separate piece, has an end assembling portion 70a provided with an outer thread 72 to be coupled to the inner thread 59 of the tubular sleeve 50 and an outer annular stop 73 to be sealed against the end annular stop 58 of the body portion 52 of the tubular bussing 50, so as to compress, between the two confronting annular stops, a sealing gasket 74 which may take, for example, the shape of an elastomer O-ring.

Figure 7:
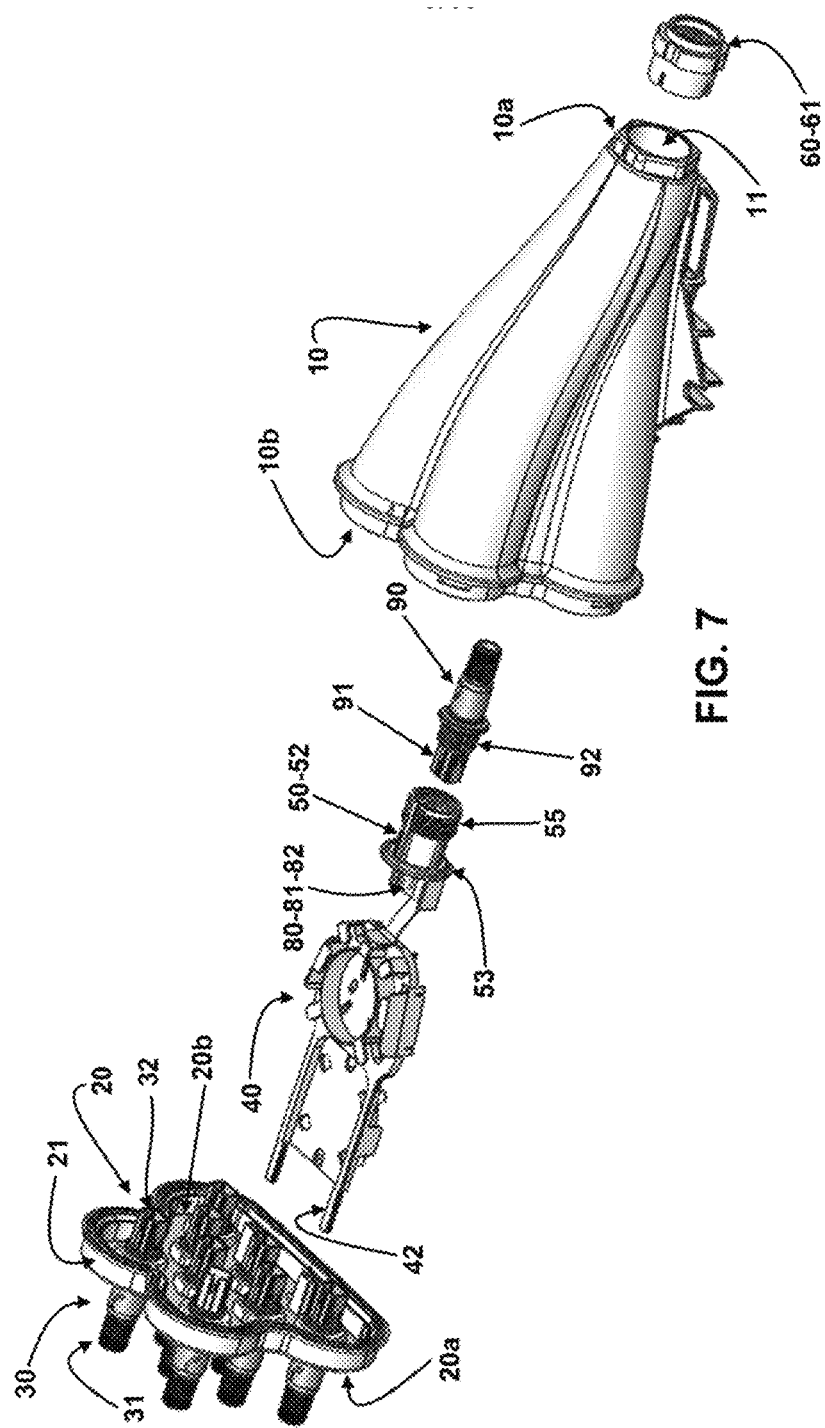
FIG. 7 shows an exploded perspective view of a third configuration of the optical termination box in question, to receive an optical distribution cable, low friction type, with a single optical fiber and already pre-connected.

In the configuration shown in FIGS. 7, 8 and 8A an optical distribution cable 100 is used in the form of a low friction cable 102, containing a single optical fiber and having its end portion 100a defined by a C-connector that does not penetrate the inner part of the tubular housing 10. In this construction, the body portion 52 of the tubular bushing 50 also has the end annular stop 58 and an internal thread 59. Meanwhile, the tubular extension 70 of the tubular bushing 50 is defined by an input adapter 90 designed to hermetically receive and retain the C-connector defining the terminal portion 100a of the low friction optical cable 102, which is already prepared in a "connected" manner. In this construction, the input adapter 90 has an end 91 provided with external thread 92 to be coupled to the inner thread 59 of the tubular bushing 50 and an outer annular stop 93 to be hermetically pressed with intermediation of a gasket 74, against the end annular stop 58 of the body portion 52 of the tubular bushing 50.

While only three assembly configurations of optical distribution cable have been presented heretofore, it should be understood that changes in shape and arrangement of the different component parts of the box may be made without deviating from the defined inventive concept in the context of the claim that accompanies this descriptive report.

The invention claimed is:

1. An optical termination box, comprising: a tubular housing (10) having an open end (10b) and an enclosed end (10a), provided with an input opening (11) of an optical distribution cable (100); a cover 20 secured to the open end (10b) of the housing (10) and pierced by output adapters (30) each having an outer end (31) and an inner end (32) to be connected to the cable (100); and an optical fiber accommodating tray (40), to be housed within the tubular housing (10) when the accommodating tray is attached to the cover (20) and having a first end (41) to be seated internally against the closed end (10a) of the tubular housing (10) and a second end (42) internally assembled to the cover (20), characterized in that the first end (41) of the tray (40) carries a tubular bussing (50) having a base portion (51) to be seated, inside the tubular housing (10), against the closed end (10a) of the housing, and a body portion (52) that protrudes out of the input opening (11) and externally cooperates with a puller (60) operatively associated with the closed end (10a) of the tubular housing (10), keeping the base portion (51) of the tubular bushing (50) axially pressed so tight against the closed end (10a) of the tubular housing (10), the said tubular bushing (50) receiving and retaining, in its interior, hermetically, a terminal portion (100a) of an optical distribution cable (100) containing at least one optical fiber (FO).

2. The box according to claim 1, characterized by the fact that closed end (10a) of the tubular housing (10) has, around the input opening (11), an internal annular stop (13) facing the inner part of the tubular housing (10) and an outer annular stop (14) facing outwards, the base portion (51) of the tubular bushing (50) being externally provided with a peripheral flange (53) being pressed by the puller (60) and, hermetically, against the annular stop (13) of the tubular housing (10) and the puller (60) being seated against the outer annular stop (14) of the tubular housing (10).

3. The box according to claim 2, characterized by the fact that body portion (52) of the tubular bushing (50) is provided with an outer thread (55), the puller (60) being defined by a nut (61) to be engaged with the outer thread (55), of the body portion (52) and seated against the outer annular stop (13) of the closed end (10*a*) of the tubular housing (10).

4. The box according to claim 3, characterized by the fact that body portion (52) of the tubular bushing (50) incorporates at least one locking means (57), the nut (61) provided with at least one catch receiving means (67) to be engaged with the locking means (57), locking the locking nut (61) after the latter has reached a final position for pulling the tubular bushing (50).

5. The box according to claim 4, characterized by the fact that locking means (57) takes the form of an outer shoulder 57*a* incorporated in the body portion (52) of the tubular bushing (50), close to the base portion (51), but externally of the tubular housing (10), and the receiving latch means (67) defined by a groove (67*a*) to be engaged with the projection (57*a*), locking nut (61) in its final pulling position of the tubular bushing (50).

6. The box according to claim 1, characterized by the fact that body portion (52) of the tubular bushing (50) carries a tubular extension (70) within which the terminal portion (100*a*) of the optical distribution cable (100) is hermetically housed and retained, hermetically closing the input opening (11).

7. The box according to claim 6, characterized by the fact that tubular extension (70) of the tubular bushing (50) is defined by a heat-shrinkable tube enclosing an extension of the optical distribution cable (100) provided with at least one optical fiber and at least two pulling elements (ET) and which end portion (100*a*) penetrates into the tubular housing (10) through the tubular bushing (50), said pulling elements (ET) being secured at least in part to a retention means (80) carried by the base portion (51) of the tubular bushing (50).

8. The box according to claim 7, characterized by the fact that tubular extension (70) is integrally incorporated with the body portion (52) of the tubular bushing (50).

9. The box according to claim 7, characterized by the fact that body portion (52) of the tubular bushing (50) has an end annular stop 58 and an inner thread (59), the tubular extension (70) having a mounting end (70*a*) provided with an outer thread (72) to be coupled to the internal thread (59) of the tubular bushing (50) and an outer annular stop (73) to be sealed, hermetically, against the end annular stop (58) of the body portion (52) of the tubular bushing (50).

10. The box according to claim 7, characterized by the fact that optical distribution cable (100) is defined between a single optical fiber low friction cable (102) to be split into multiple bare fiber splitters, and a multiple optical fiber cable (101), with its optical fibers separated by optical fiber extensions (EFO) within the tubular housing (10), each output adapter (30) having an outer end (31) and an inner end (32) to which is connected a respective fiber splitter or optical fiber extension (EFO).

11. The box according to claim 6, characterized by the fact that body portion (52) of the tubular bushing (50) has an end annular stop (58) and an inner thread (59), the tubular extension (70) of the tubular bushing (50) defined by an input adapter (90) in which a connector (C) is engageable defining the end portion (100*a*) of an optical distribution cable (100) in the form of a low friction cable (102) having a single optical fiber, the input adapter (90) having an end (91) provided with an external thread (92) to be coupled to the inner thread (59) of the tubular bushing (50) and an outer annular stop (93), to be hermetically pressed against the end annular stop (58) of the body portion (52) of the tubular bushing (50).

12. The box according to claim 6, characterized by the fact that cover (20) has a peripheral skirt (21) to be telescopically assembled and attached, hermetically and sealed, to a peripheral portion of the open end (10*b*) of the tubular housing (10); and each output adapter (30) hermetically piercing the cap (20).

13. The box according to claim 12, characterized by the fact that cover (20) is further pierced through a through-hole (20*d*) by a check valve (25), pressurizing the tubular housing (10) with its input opening (11) and its open end (10*b*) closed.

* * * * *

Disclaimer

10,234,647 B2 - Anderson Marcelo Stancyk, Araucária (BR); Wilherm Toshio Kinoshita Yoshizawa; Gabriel tanner Pasetti, both of Curitiba (BR). OPTICAL TERMINATION BOX. Patent dated March 19, 2019. Disclaimer filed November 16, 2022, by the assignee, Bell Helicopter Textron Inc.

I hereby disclaim the following complete claims 1-8, 10-13 and 15-25, of said patent.

*(Official Gazette, May 2, 2023)*